United States Patent
Holland et al.

(10) Patent No.: US 6,618,753 B2
(45) Date of Patent: *Sep. 9, 2003

(54) SYSTEMS AND METHODS FOR REGISTERING GIFT REGISTRIES AND FOR PURCHASING GIFTS

(75) Inventors: Jeremy Mark Holland, San Carlos, CA (US); Jessica Dilullo Herrin, San Francisco, CA (US); Jennifer Lefcourt, San Francisco, CA (US); Andrew Michael Mosson, San Francisco, CA (US)

(73) Assignee: WeddingChannel.com, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/273,326

(22) Filed: Oct. 15, 2002

(65) Prior Publication Data

US 2003/0036973 A1 Feb. 20, 2003

Related U.S. Application Data

(63) Continuation of application No. 09/459,766, filed on Dec. 13, 1999, now Pat. No. 6,493,742.

(51) Int. Cl.$^7$ ............................................. G06F 15/167
(52) U.S. Cl. ..................... 709/217; 709/200; 709/203; 709/219; 709/227; 707/3; 707/10; 707/201; 705/26; 705/27
(58) Field of Search ................................. 709/200–203, 709/213, 217–219, 223–224, 227–228; 707/1–10, 100, 104.1, 201–203; 705/26–27, 10, 14; 235/379–381

(56) References Cited

U.S. PATENT DOCUMENTS

| | | | |
|---|---|---|---|
| 5,663,547 A | 9/1997 | Ziarno | 235/380 |
| 5,665,952 A | 9/1997 | Ziarno | 235/380 |

(List continued on next page.)

OTHER PUBLICATIONS

PRNEWSWIRE; "Free Wedding Planning Products Guide Couples Through the Process High–Tech Help for Those Saying 'I do'"; Dec. 1997.

Press Release, "Wedding Bells Ring for Cyber–Matrimony Super–Site", WeddingPlanner.com, Apr. 14, 1997.

Press Release, "The Wedding Channel Unites with Worldview Systems and Internet Travel Network to Make Honeymoon Planning Easier and More Convenient Than Ever", The WeddingChannel, May 27, 1997.

Press Release, "The WeddingChannel and Vicinity Connect Couples with Wedding Businesses Nationwide", The WeddingChannel, Jun. 9, 1997.

Web page, "Wedding 411", at wedding411.com/ifb, printed Apr. 22, 1998.

(List continued on next page.)

Primary Examiner—Bharat Barot
(74) Attorney, Agent, or Firm—Pennie & Edmonds LLP

(57) ABSTRACT

A method of creating an aggregated Internet accessible registry includes the step of accepting a query from a registrant. The query contains an identifier and a search criteria, the identifier identifying one of a multitude of registry databases. Registries matching the search criteria in the selected registry database are retrieved. When the registrant selects one of the matching registries, a general user identifier that uniquely identifies the registrant is associated with the registry. Additional queries and registry selection completes the aggregation registry process. The aggregated registry is managed on-line by the registrants and accessed by guests. The aggregated registry provides a framework that allows automated updates by registry database provides without loss of the identity of an aggregated registry.

68 Claims, 11 Drawing Sheets

U.S. PATENT DOCUMENTS

| | | | |
|---|---|---|---|
| 5,696,366 A | 12/1997 | Ziarno | 235/380 |
| 5,710,887 A | 1/1998 | Chelliah et al. | 705/26 |
| 5,754,981 A | 5/1998 | Veeneman et al. | 705/26 |
| 5,758,331 A | 5/1998 | Johnson | 705/412 |
| 5,765,142 A | 6/1998 | Allred et al. | 705/26 |
| 5,774,874 A | 6/1998 | Veeneman et al. | 705/27 |
| 5,794,219 A | 8/1998 | Brown | 705/37 |
| 5,809,481 A | 9/1998 | Baron et al. | 705/14 |
| 5,826,242 A | 10/1998 | Montulli | 705/27 |
| 5,845,293 A | 12/1998 | Veghte et al. | 707/202 |
| 5,870,718 A | 2/1999 | Spector | 705/26 |
| 5,884,270 A | 3/1999 | Walker et al. | 705/1 |
| 5,898,594 A | 4/1999 | Leason et al. | 700/231 |
| 5,948,054 A | 9/1999 | Nielson | 709/200 |
| 5,953,400 A | 9/1999 | Rosenthal et al. | 379/202 |
| 5,970,474 A | 10/1999 | LeRoy et al. | 705/27 |
| 5,978,813 A | 11/1999 | Foltz et al. | 707/201 |
| 6,055,573 A | 4/2000 | Gardenswartz et al. | 709/224 |
| 6,138,106 A | 10/2000 | Walker et al. | 705/14 |
| 6,154,745 A | 11/2000 | Kari et al. | 707/100 |
| 6,338,082 B1 | 1/2002 | Schneider | 709/203 |
| 6,347,398 B1 | 2/2002 | Parthasarathy et al. | 717/11 |
| 6,363,497 B1 | 3/2002 | Chrabaszcz | 714/13 |
| 6,381,594 B1 | 4/2002 | Eichstaedt et al. | 707/3 |
| 6,493,742 B1 * | 12/2002 | Holland et al. | 709/200 |

OTHER PUBLICATIONS

Web page, Wedding 411—WebPlace™, at wedding411.com/wp/wp——index.cfm, printed Apr. 22, 1998.

Web page, TheGift.com—On–line gift shop an wedding registry. Large gift section, at thegift.com/welcome.htm, printed Apr. 22, 1998.

Web page, "The Wedding Network—Information", at wedreg.com/information/FAQ.html, printed Apr. 22, 1998.

Web page, "Welcome to the Wedding Network", at wedreg.com/WO/WebObject, printed May 13, 1998.

Web Page, Sample Wedding Page, at thegift.com/sampleinfo.htm, printed May 13, 1998.

Web page, "Couples Services", at website.net/couplesservices/index.htm, printed May 14, 1998.

Web Page, "Wedding 411—WebPlace™—Personalized Wedding Planning" at wedding411.com/wp/wp——index.cfm, printed Jul. 2, 1998.

Web page, "What is Our Wedding?", at URL=http://www.weddingchannel.com, printed Jul. 2, 1998.

"Macy's Weddingline", Jun. 1996, Business Wire.

"New Service Breaks Boundaries in Wedding Registry", Mar. 1998, Business Wire.

Press Release 'Bridalnet Brings Fashion, Beauty and "Hip" Perspectives to Wedding Channel, The Ultimate Online Wedding Resource,' Jun. 9, 1997.

"A bridal bonanza; The WeddingChannel and The Registry Stores form partnership", Mar. 2, 1998, Home Furnishing Network (HFN) 9, vol. 72, p. 28.

"WeddingChannel's Popularity Reaches 2,000 Visitors Per Day", Nov. 25, 1997, PRNewswire.

"WeddingChannel To Integrate Bridal Registry Online", Feb. 23, 1998, PR Newswire.

"Electronic wave: housewares find a home in alternate shopping channels", Home Furnishing Network 41, vol. 61, p. 77, Oct. 13, 1997.

"PRIMEDIA's Modern Bride Forms A Joint Venture and Invests in web–based Gift Registry Company", Mar. 1998, PR Newswire.

"WeddingChannel Bolsters Service with Online Bridal Registry", Apr. 20, 1998, PR Newswire.

U.S. patent application No. 09/316,670 filed May 21, 1999, Gray et al. "Centralized Weddig Coordination Server".

* cited by examiner

SYSTEMS AND METHODS FOR REGISTERING GIFT REGISTRIES AND FOR PURCHASING GIFTS

CROSS REFERENCE TO RELATED APPLICATION

This application is a continuation of U.S. application Ser. No. 09/459,766, filed Dec. 13, 1999, now U.S. Pat. No. 6,493,742 which is incorporated herein by reference in its entirety.

BACKGROUND OF THE INVENTION

1. Field of the Invention

This invention relates generally to the field of Internet accessible product registries. More particularly, this invention relates to a system and method for aggregating and managing multiple registries over the Internet.

2. Description of the Related Art

The advent of widespread access to the Internet has generated interest in the development of web applications capable of accessing registry databases. Registry databases are collections of registries. Each registry in a registry database describes a registrant, an event, and the items that the registrant would like to acquire in celebration of the event. Registry databases are generally maintained by retailers such as department stores. An event may be, for example, an engagement, wedding, anniversary, birthday, graduation, religious holiday, baby shower, baptism, confirmation, Mother's day, Father's day, or other significant event. Further, rather than representing an event, a registry may simply represent the generalized wish list of the registrant.

Internet accessible registry databases have many advantages over registry databases that are exclusively available in the store. First, an Internet accessible registry removes geographic limitations. Trips to the store to purchase registry items or to create a registry are no longer necessary. One simply accesses the registry over the Internet from the convenience of the home or office. The hassle of traffic, waiting in lines, and reliance on sales staff is circumvented. Using an Internet accessible registry, it is possible for a Tuscaloosa Ala. couple to register with a retailer in Manhattan, or for that matter, Venice, Italy. Second, for guests, the purchasers of registration items from a registry, options such as gift routing and wrapping are conveniently handled directly over the Internet. For example, gift wrapping and its concomitant hassles, such as waiting in long gift wrapping lines, is prevented by making such on-line designations. Third, Internet accessible registry databases provide advantages to retailers such as reduction in overhead costs and product exposure to an expanded, geographically unconstrained market—benefits that may be passed on to the consumer in the form of reduced retail prices.

Retailers that provide registration services over the Internet typically restrict the content of their registry databases to products offered by the individual retailer or, at best, to those of a highly limited number of retail partners. Thus, registrants to major events such as weddings must still register with several different retailers in order to attempt adequate coverage. Often registrants are not satisfied with the scope of their selections even after several different retailer-specific registries have been made. However, the typical registrant does not create more retailer-specific registries because of the burden it places on guests and because of the high degree of maintenance that is required by the registrant to maintain such a large number of registries. Further, existing retailer-specific registries do not offer registrants the option of registering unconventional items such as maid service, cooking lessons, or camping gear.

Even with the introduction of Internet accessible registries, the practice of restricting registry database content produces the unsatisfactory result that guests attempting to buy gifts for registrants must search multiple retailer-specific web sites. Such inconvenience is magnified when the guest does not even know where the registrant is registered. Several retail independent web sites have attempted to address the shortcomings of retailer-specific Internet accessible registry databases. These web sites allow a registrant to build a gift registry that is not retailer-specific. However, while functional, such web sites are unsatisfactory in practice. The registrant must manually enter large amounts of information, such as a product description, price, and possible places that the registry item can be found. Further, there is no method by which a retailer can update the registry when a purchase is made. Rather, such web sites typically require that the guest update the registrants' web page as gifts are purchased. This has the disadvantage that every guest must use the registrant's web page and diligently update it. Often, this is simply not possible because some of the guests do not have access to the Internet.

In view of the situation described, what is needed in the art is a system and method for managing a large number of registries in a single uniform environment such that the amount of work required by both the registrants and the guests is minimized and the content of the registries is expanded beyond traditional retail content.

SUMMARY OF THE INVENTION

The present invention provides a system and method for aggregating registries. The system and method allows registrants to collect all registries, both custom and retailer-specific, in a single web site. The present invention allows registrants to expand the number of event types for which they create registries. Using the features of the present invention, registries for even the most common events, such as birthdays, are created by registrants and are easily accessed by relatives and friends over the Internet.

In a preferred embodiment, a query from a registrant, which includes an identifier and a search criteria, is received by a server. The identifier is used to select a particular registry database from a plurality of registry databases. The search criteria is used to identify matching registries in the selected registry database. In response to a selection of one of the matching registries, a user identification that uniquely identifies the registrant is associated with the selected registry. As the registrant selects additional registries, an aggregated registry forms that is composed of each registry that has been chosen. Because selected registries are associated with a user identification rather than transferred to a secondary registry database, an aggregated registry typically spans multiple primary registry databases.

In another aspect of the present invention, a query is received from a guest and multiple registry databases are searched. The query typically includes a name of a registrant and an event date. A unique identifier, for each matching registry in any of the multiple registry databases, is then communicated to the guest. When the guest selects one of the unique identifiers, the registry associated with the unique identifier is opened for review. The guest may pick items in the registry for purchase while the registry is open. In a preferred embodiment, the guest may make additional queries. The additional queries may designate different registrants or additional event dates. As with the original query, each registry database is searched for matching registries. Unique identifiers, each representing a matching registry, are communicated to the guest. The guest selects one of the unique identifiers and the corresponding registry is opened. Items selected by the guest from the opened registry are added to an aggregated purchase list that includes all items selected by the guest from previously selected registries.

When the guest has finished making queries and selecting items, a single purchase transaction is performed. The purchase transaction includes the steps of producing a requisition for each registry database provider represented in the aggregated purchase list. Each requisition corresponds to a particular registry database provider and includes each item in the purchase list that originated from a particular registry database supported by the corresponding registry database provider. Then, using a credit and/or debit system, such as a credit card associated with the guest, an electronic purchase transaction is executed for each requisition.

In a preferred embodiment of the present invention, a registrant may log onto a server. During the log in process, a unique user identifier is obtained from the user profile of the registrant. The user identifier is used to generate an aggregated registry that includes each registry in a multitude of registry databases. Once the registrant selects one of the registries in the aggregated registry, management of the registry over the Internet is possible. On-line management typically includes adding/deleting items from the registry, reviewing the registry purchase order history, altering an item order quantity in the registry, identifying a party that has made an order using the registry; and/or sending a message to a party that has made an order using said registry.

In yet another preferred embodiment, registry database providers may access their registry databases from a server to review/update registry databases with in store activity, revise on-line catalogs of products, and review registry orders. However, even when registry database providers update their respective registry databases, aggregated registries, i.e. the associations between user identifications and registries, are preserved.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

General Architecture

Figure 1:
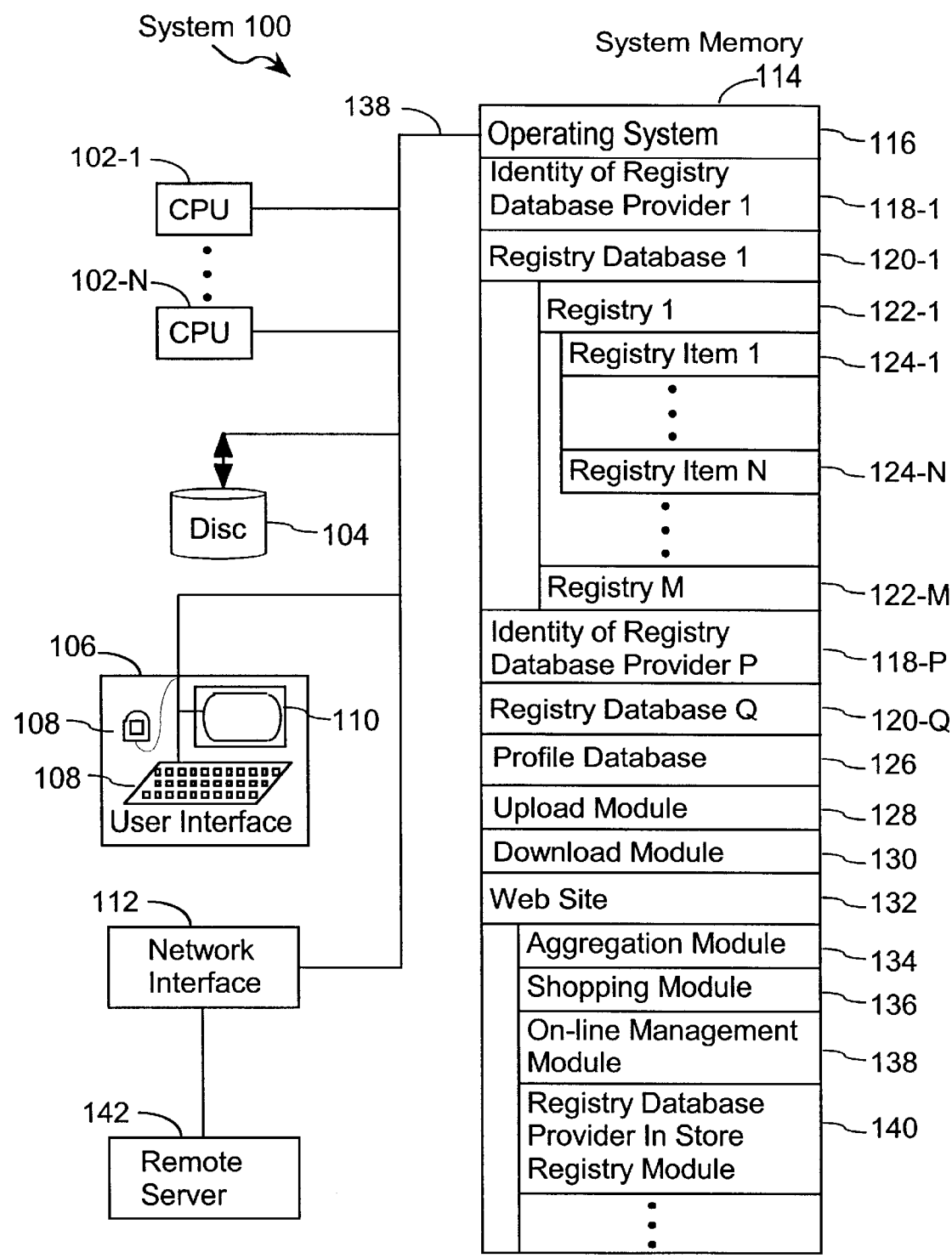
FIG. 1 illustrates a server in accordance with the present invention.

FIG. 1 is a general illustration showing the architecture of system 100 that is in accordance with the present invention. System 100 has a standard computer configuration including at least one central processing unit (CPU) 102, at least one hard disc 104, an optional user interface 106, a network interface 112, and a system memory 114 that are connected by bus 138. Disc 104 is used to store various components of system memory 114. Optional user interface 106 can perform tasks such as monitoring traffic on system 100, controlling disc 104 data upload or download, and/or optimizing a component of system memory 114. Network interface 112 provides Internet access to system 100. Further, network interface 112 provides access to one or more remote servers 142.

The components in system memory 114 in this exemplary system include an operating system 116 and the identity of registry database providers 118. In one embodiment of the present invention, a registry database provider 118 may be a retailer such as a department store. Each registry database provider 118 may be associated with one or more registry databases 120. There is no limit on the number of distinct registry databases 120 that a particular registry database provider 118 may have in system memory 114.

In an illustrative preferred embodiment, each registry 122 in registry databases 120 may include search data such as the full name of the registrant and, if existing, coregistrants, an event date and location, the store number where registry 122 was created, and a sales consultant number or name. Registry 122 may further include a field that specifies a registrant password that is used if the registry is to be password protected by system 100. Similarly, registry 122 may specify a guest password that must be specified by a guest before access is granted to registry 122. In the preferred embodiment, registry 122 includes a shipping address to use for purchases made prior to the event and a second shipping address that is to be used after the event. Further, registry 122 may include a variety of control flags. For example, registry 122 may include a flag that controls whether the registry is accessible over the Internet, a status flag that is capable of designating whether the registry is "active" or canceled, a flag that records when the last change to registry 122 was made, and/or an add/update flag that may be used to synchronize registry 122 with a registry on another server. Finally, each registry 122 in the preferred embodiment includes registry items 124. Preferably, each registry item 124 has a retailer registry identifier such as a stock keeping unit ("SKU") or a universal product code ("UPC") number, a quantity desired, the quantity of the product that has already been purchased, a description of the product, and the product purchase price.

The components of system memory 114 in the exemplary system of FIG. 1 further include a profile database 126 that has the profile of each person that logs into system 100. People that log into system 100 may be registrants of one or more registries 122, or guests seeking to purchase registry items 124.

System memory 114 also includes an upload module 128 for receiving an update of registry database 120 from a registry database provider. Such updates may be incremental updates or full replacements of a registry database 120. In a preferred embodiment, a registry database 120 is assigned an update file and an associated update control file. When update of registry database 120 is required, a registry database provider sends the update file to system 100 from a remote computer through network interface 112. Preferably, the update file is sent using file transfer protocol (FTP). Once transfer of the update file to system 100 has completed, the update control file is sent. The presence of update control file in system 100 triggers upload module 128 to open the associated update data file and update the appropriate registry database 120 with the contents of the update file. The update control file is then deleted from system 100. One of skill in the art will appreciate that numerous variations of upload module 128 are possible. All such variations are within the scope of the present invention. For example, in an alternative embodiment, the control file is not deleted from system 100 after an update. Rather, upload module is triggered to perform a subsequent update when the timestamp of the update control file changes.

In some embodiments of the present invention, system memory 114 includes a download module 130 that may be used by registry database providers 118 to download registry orders made by guests and/or registry 122 updates made by registrants on system 100. In a preferred embodiment, download module 130 may be implemented as an FTP server. When a registry database provider provides the appropriate password associated with the registry database provider, access is granted and information downloaded. Preferably, registry orders are in a file with a customized format that was specified by the registry database provider 118. It will be appreciated that the data transferred by upload module 128 and download module 130 may be secured in a variety of different ways known to those of skill in the art. For example, the data may be encrypted, transferred over the open Internet, on leased lines, or on virtual private networks.

Web site 132 provides a graphical user interface that is used by guests, registrants, and registry database providers. Web site 132 includes three modules, an aggregation module 134 for aggregating registries 120, a shopping module 136 that provides an interface to guests, and an on-line management module 138 that provides an Internet interface for on-line registry management by registrants. Web site 132 may optionally include a variety of other modules, such as a registry database provider in store registry module 140. Module 140 may support registry database providers such as small businesses or shop owners that do not have an in house electronic registry database. Module 140 may be accessed from such businesses or shop owners and serve as a proxy to an in house electronic registry.

Figure 2:
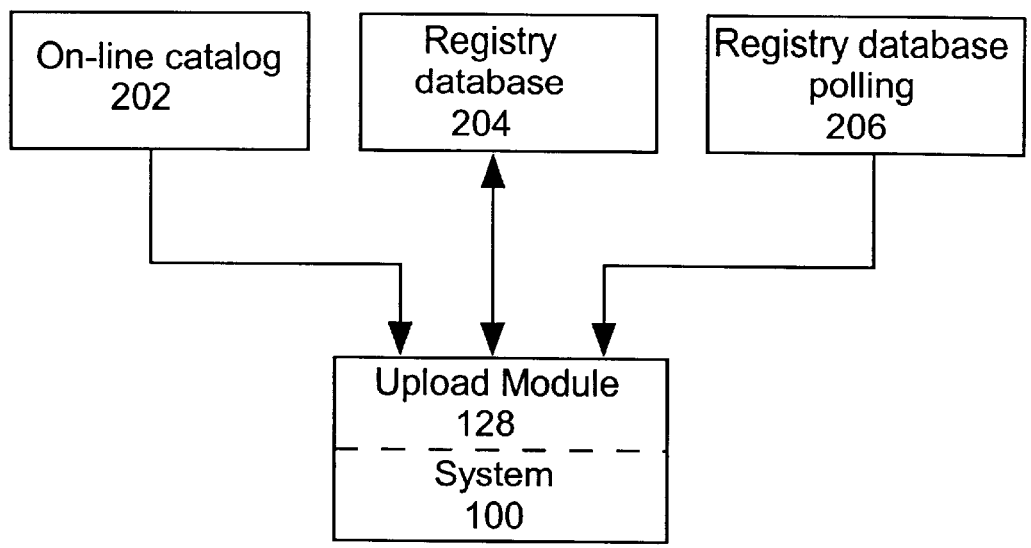
FIG. 2 illustrates various sources of registry databases in accordance with the present invention.

The utility of upload module 128 may be further appreciated by reference to FIG. 2. As illustrated in FIG. 2, upload module 128 may be used to upload an Internet accessible on-line catalog 202 from a retailer. On-line catalog 202 may include a list of products and/or services available from the retailer. In a preferred embodiment, web site 132 provides an interface to an on-line catalog 202. This allows registrants to access the on-line catalog 202 through network interface 112 in order to build a registry. Registries built using web site 132 are added to the registry database 120 that corresponds to on-line catalog 202. In a preferred embodiment, a diverse array of on-line catalogs 202 are hosted by web site 132. Such an embodiment provides a replacement to in store registration and allows a registrant to register with a wide array of registry database providers and to specify unconventional gift items.

As shown in FIG. 2, upload module 128 may upload a registry database 204 from registry database provider 118. In some embodiments of the present invention, upload module 128 may be used to poll select uniform resource locations (URLs) for content 206. When content is found at a particular URL, upload module updates a registry database 120 with the content from the particular URL. Therefore, in such embodiments, system 100 provides access to registry databases 120 from retailers that do not provide information directly to system 100 through direct channels.

Figure 3:
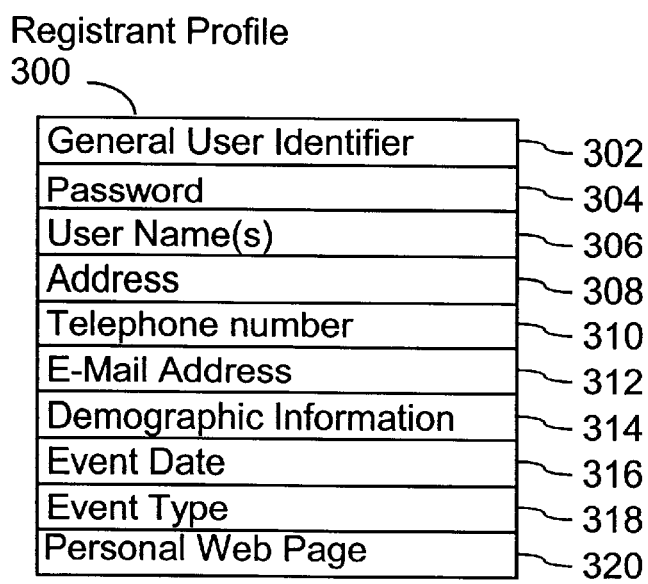
FIG. 3 illustrates a registrant profile that includes a general user identifier and personal data, in accordance with one embodiment of the present invention.

Profile database 126 (FIG. 1) is used to store user profiles. A user profile may include information about a registrant (registrant profile) and/or a guest (guest profile). As illustrated in FIG. 3, each registrant profile 300 includes a unique general user identifier 302. The general user identifier 302 provides a method for identifying, independent of the actual name of the registrant, a particular registrant. A registrant profile 300 also includes a password 304. When a registrant logs into system 100, in a preferred embodiment, the registrant is prompted to provide password 304. It will be appreciated that the general user identifier 302 may serve as a password in some embodiments of the present invention and that, in such embodiments, registrant profile 300 does not have a separate password field 304. As depicted in the exemplary profile of FIG. 3, registrant profile 300 may include a user name 306, an address 308, a telephone number 310, and an E-mail address 312. The registrant profile may also include demographic information 314 such as an age and/or household income.

In some embodiments of the present invention, registrant profile 300 includes an event date 316 and an event type 318, such as a wedding or birthday. Further, a personal web page 320 may be designed using a profile wizard provided by web site 132 and associated with a particular event. The personal web page may provide guests with information such as news related to the event, driving instructions, hotel information, and/or uploaded images.

In yet other embodiments of the present invention, the registrant profile stored in profile database is two-tiered. The top tier includes basic information about a registrant, including a general user identifier. Several lower tiered profiles may exist, each representing a distinct event for which the registrant has registered. Each of the second-tiered profiles may include an associated web page that provides information related to the event.

Preferably, each guest profile includes the information necessary to support a single click purchase by the guest. Such information typically includes credit card and/or debit card information, a billing address and a reference phone number or E-mail address. The guest profile is typically generated by prompts made by system 100 the first time a guest logs in to the system.

Registry Aggregation

Figure 4:
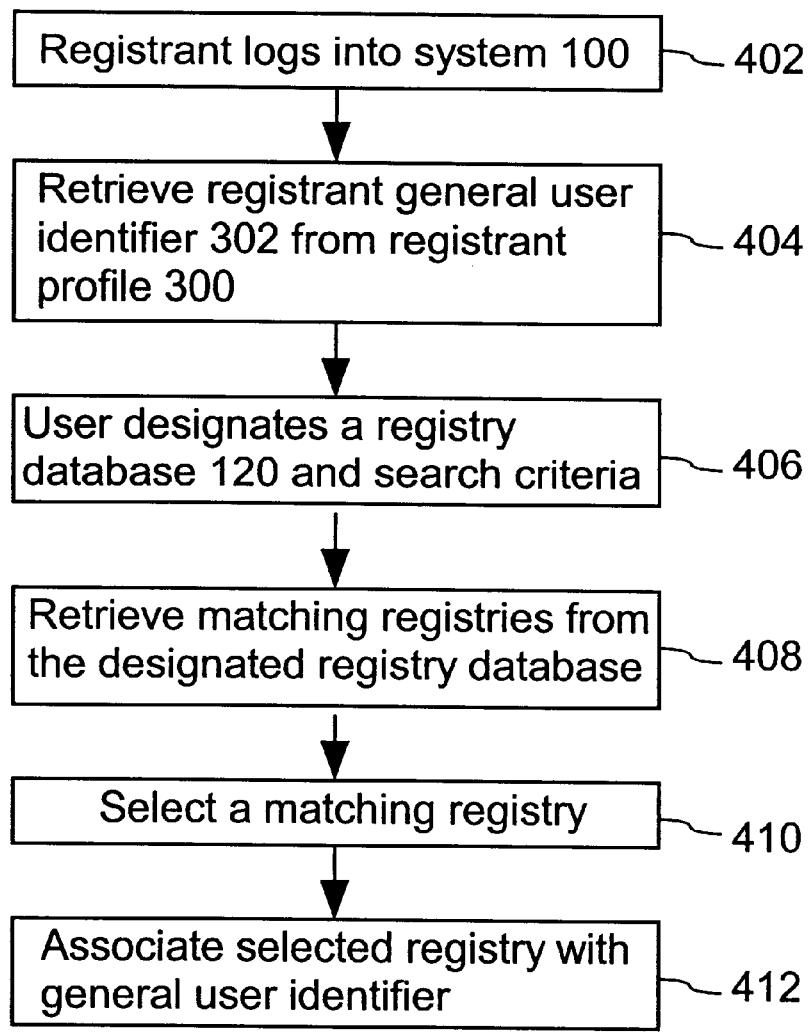
FIG. 4 illustrates the processing steps associated with the method of creating an aggregated registry in accordance with one embodiment of the present invention.

Now that the general architecture of a system in accordance with the present invention has been disclosed, the concept of registry aggregation can be described. Referring to FIG. 4, an exemplary registry aggregation process is illustrated. In a preferred embodiment, the exemplary registry aggregation process of FIG. 4 is hosted by web site 132. In the first processing step of FIG. 4, a registrant logs into system 100 (402). In step 402, profile database 126 (FIG. 1) is queried for the registrant profile 300 associated with the registrant. When there is no associated registrant profile 300 in profile database 126, system 100 generates a registrant profile 300 for the registrant and assigns a unique general user identifier 302. In the next processing step, the general user identifier 302 is obtained from the registrant profile 300 (404). In processing step 406, a query is accepted from the registrant. The query includes the name of a particular registry database 120 (FIG. 1) as well as search criteria. One of skill in the art will appreciate that several different techniques may be implemented to facilitate selection of a particular registry database 120 by the registrant in processing step 406. As an example, the name of each registry database provider 118 may be listed in a pull down menu on web site 132. When a registrant selects a particular registry database provider 118, all registry databases 120 associated with the particular registry database provider 118 are listed on a submenu. A particular registry database 120 may then be selected from the submenu. Although many other embodiments are within the scope of the present invention, in a preferred embodiment, the search criteria provided in step 406 includes a first and last name and an event date.

In processing step 408, the search criteria specified in processing step 406 are used to search the specified registry database 120 for matching registries 122. Next, in processing step 410, the registrant selects a matching registry 122. In processing step 412, the general user identifier 302 of the registrant is assigned to the registry 122 selected in processing step 410. Preferably, the assignment of a general user identifier 302 to a registry 122 is made by populating a specific field in registry 122, which is reserved for general user identifiers, with general user identifier 302.

In a preferred embodiment, the assignment of a general user identifier 302 to a registry 122 is not overwritten when registry database 120 is updated by upload module 128. Thus, for example, the assignment is not overwritten even when the registry database provider 118 associated with the registry database 120 that includes registry 122 updates the registry.

Registry aggregation occurs when the process illustrated in FIG. 4 is repeated by a particular registrant. Each time the registrant repeats the processing steps of FIG. 4, an additional registry 122 is associated with the general user identifier 302 of the registrant. The collection of registries, throughout the various registry databases 120, that have been associated with a particular registrant using a process such as that shown in FIG. 4 is defined herein as an aggregated registry.

Figure 5:
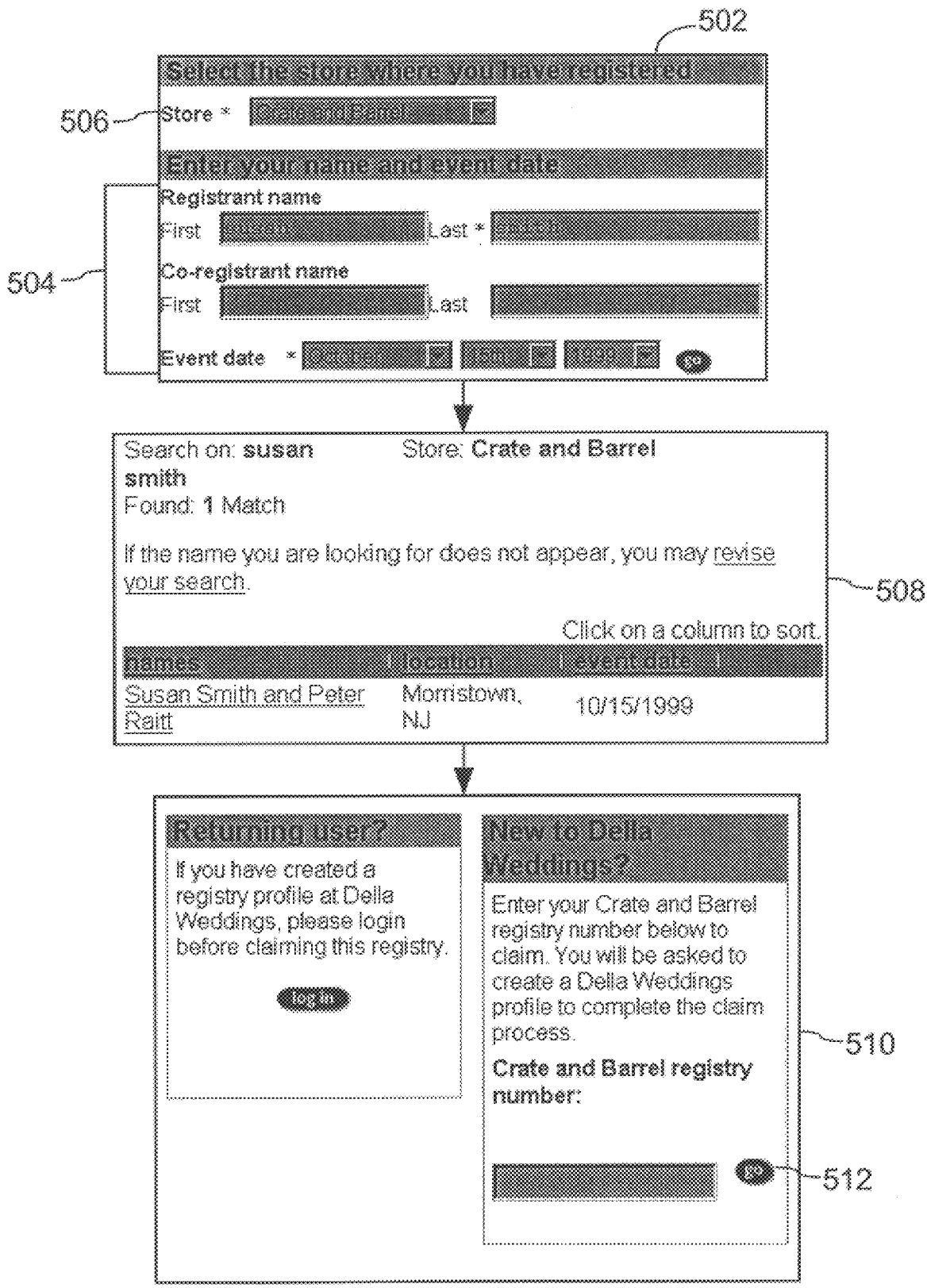
FIG. 5 illustrates an exemplary process for associating a user identification with a registry in accordance with one embodiment of the present invention.

To illustrate the aggregation process of FIG. 4, FIG. 5 shows various states of illustrative web site 132 in accordance with the present invention. First, web site 132 provides a form 502 that facilitates entry of the processing step 406 (FIG. 4) query. Form 502 includes fields 504 for the search criteria aspect of the query and field 506 for specification of the registry database 120 to be searched. Field 504 may include, for example, a first name and a surname. When form 502 is submitted, search criteria 504 are used to search the registry database 120 specified in field 506 for matching registries 122. Panel 508 illustrates registries 122 found in the search. When a registrant selects a matching registry 122 from a panel such as panel 508, web site 132 displays a screen such as that depicted in panel 510. In panel 510, the registrant confirms that he is the "owner" of the registry selected in panel 508 by use of field 512. Then, the selected registry 122 is updated to include the general user identifier 302 associated with the registrant.

In view of the foregoing general description of the invention, those skilled in the art will recognize a number of benefits associated with the disclosed technology. For example, there is no requirement that the various registries in an aggregated registry be in the same registry database 120. Thus, there is no requirement that the various registries 122 in the aggregated registry have a similar or compatible data structure. Furthermore, because registries in an aggregated registries are left intact in their native registry databases, it is possible for registry database providers to upload database updates without overwriting the associations made in the aggregation process. Another advantage of the aggregated registry is that it is not dependent upon the name of the registrant or other personal information provided by the registrant. Thus, an aggregated registry can include registries that have slight variations of the registrant's name, or indeed, different names altogether.

Yet another advantage of the present invention is that it provides a permanent framework for hosting registries throughout the life of each registrant. Accordingly, system 100 can be configured to send E-mail messages to a registrant on the eve of birthdays, and other major calendared events. The E-mail message can invite the registrant to generate an aggregated registry for the event. In another aspect of this framework, customers can rely on system 100 to send them reminders about major events, involving friends, business associates, family members or colleagues that may require the purchase of a gift or card.

Illustrative Registrant Session

Figure 6:
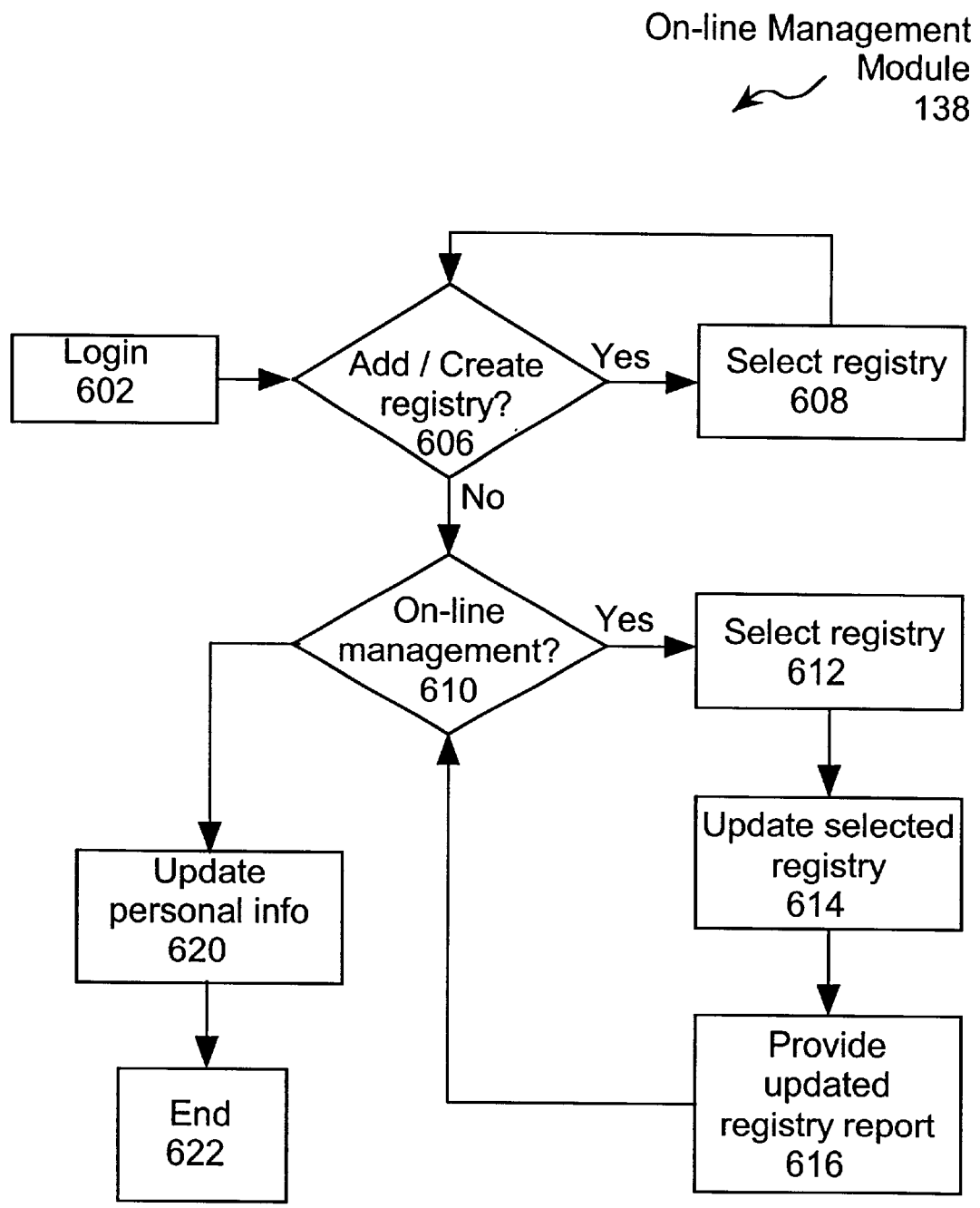
FIG. 6 illustrates processing steps associated with management of an aggregated registry by a registrant over the Internet in accordance with one embodiment of the present invention.

To better appreciate certain aspects of the present invention, an illustrative registrant session is shown in FIG. 6. This illustrative session may represent processing steps that are performed using the on-line management module 138 of web site 132. To begin, in processing step 602, successful log in results includes identifying the general user identifier 302 associated with the registrant. Once processing step 602 is completed, the registrant can add or create registries 122 (606). Registries 122 are added by selecting a registry database 120 and providing search criteria such as an event date or name. The registrant may select an identified registry 608, using techniques described above in connection with FIGS. 4 and 5. Each time a registry 122 is selected, the general user identifier 302 is assigned to the registry. Registries 122 are created in processing step 606 when the registrant uses web site 132 to make selections from an on-line catalog 202. Repetition by processing step 606 results in the formation of an aggregated registry that can be managed over the Internet in processing step 610. The registrant selects a registry (step 612) that includes the general user identifier 302 associated with the registrant.

Once the registrant selects a registry 122, the registrant may update the registry (step 614). Such updates may include, for example, changing the order item count of a registry item 124, and adding or deleting registry items 124. Because the component registries 122 of an aggregated registry remain in their native registry databases 120, it is possible to communicate the updates made in processing step 616 to the appropriate registry database provider 120 using downloader 130.

FIG. 6 illustrates other options available to a registrant. In processing step 616, the registrant may obtain an updated registry report that includes, for example, what registry items 124 have been ordered. Further, in processing step 620, the registrant may edit the registrant profile 300. The illustrative session ends in processing step 622 when the registrant logs out.

Illustrative Guest Session

Figure 7:
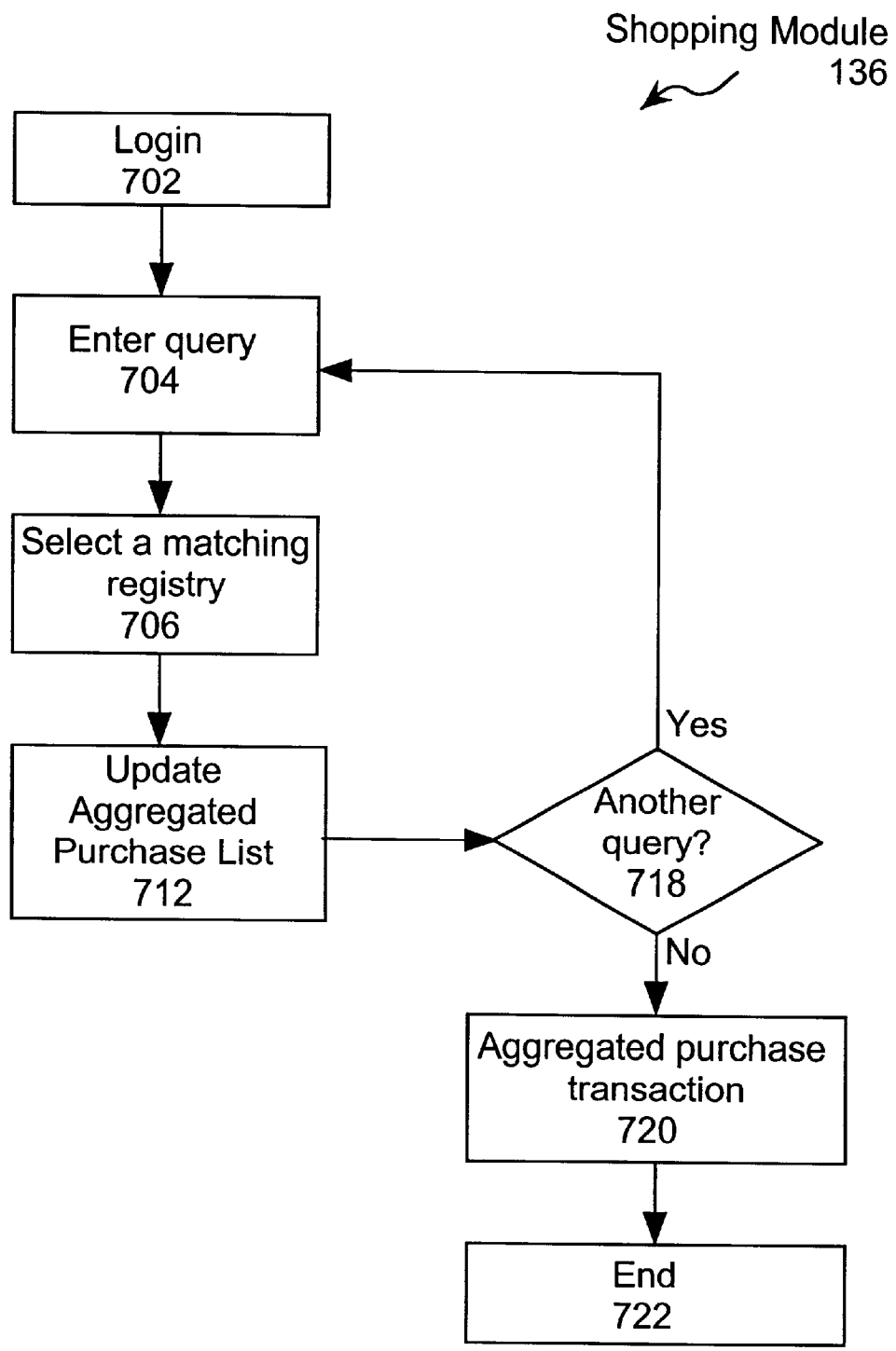
FIG. 7 illustrates processing steps associated with aggregate registry shopping over the Internet in accordance with an embodiment of the present invention.
Figure 8:
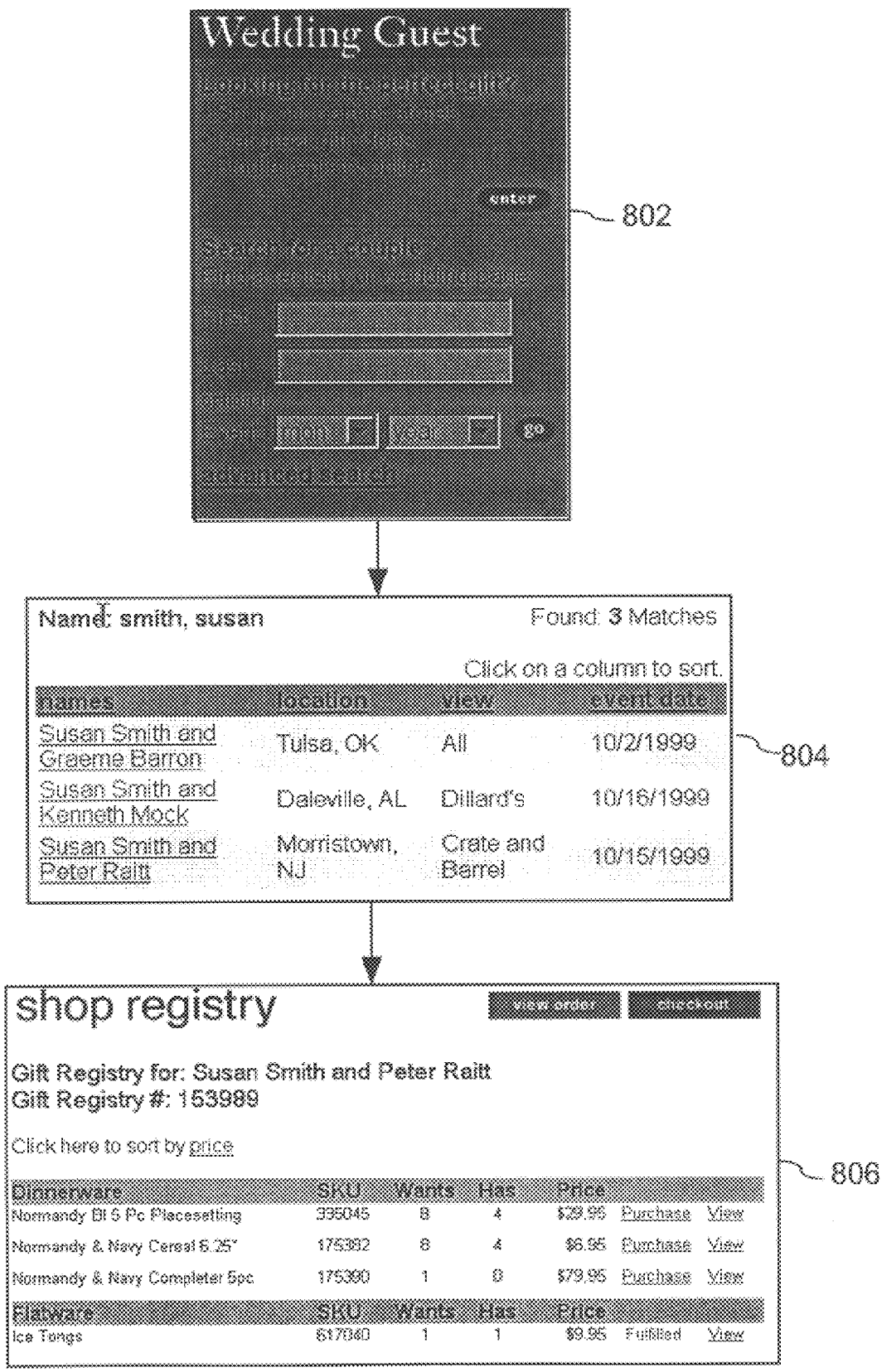
FIG. 8 illustrates the steps for an exemplary process for aggregated registry shopping over the Internet.

To better appreciate additional aspects of the present invention, an illustrative guest session is shown in FIGS. 7 and 8. In step 702, the guest optionally logs into system 100. The optional guest log in process includes identifying the guest profile associated with the guest in profile database 126. In step 704, the guest enters a query. In a preferred embodiment, such as that illustrated in panel 802 (FIG. 8), the query includes a first and last name and an optional event date. Each registry database 120 is then searched for registries 122 that match the query. As illustrated in panel 804, matching registries are displayed by web site 132 and the guest selects one of the matching registries 706. When a registry is selected, it is opened, thus allowing the guest to review the registry over the Internet. An illustrative opened registry is shown in panel 806 of FIG. 8.

One of the advantages of the present invention is that the guest may make multiple queries in a single Internet session 718. Each query 704 may be for a different party and/or event. Thus, in a single session, a guest may make several different selections, or purchases, from several different registry databases 120. Each selection made by a guest in a single Internet session is collected into an aggregated purchase list. At the end of the Internet session, a single aggregated purchase transaction 720 is performed. If the guest had logged into system 100 (702) and the guest profile includes credit card information, the single aggregated purchase transaction may be automatically performed using the information stored in the guest profile. Finally, the session ends 722. In an alternative embodiment, guests do not log into system 100 until step 720.

Aggregated Purchase List

Figure 9:
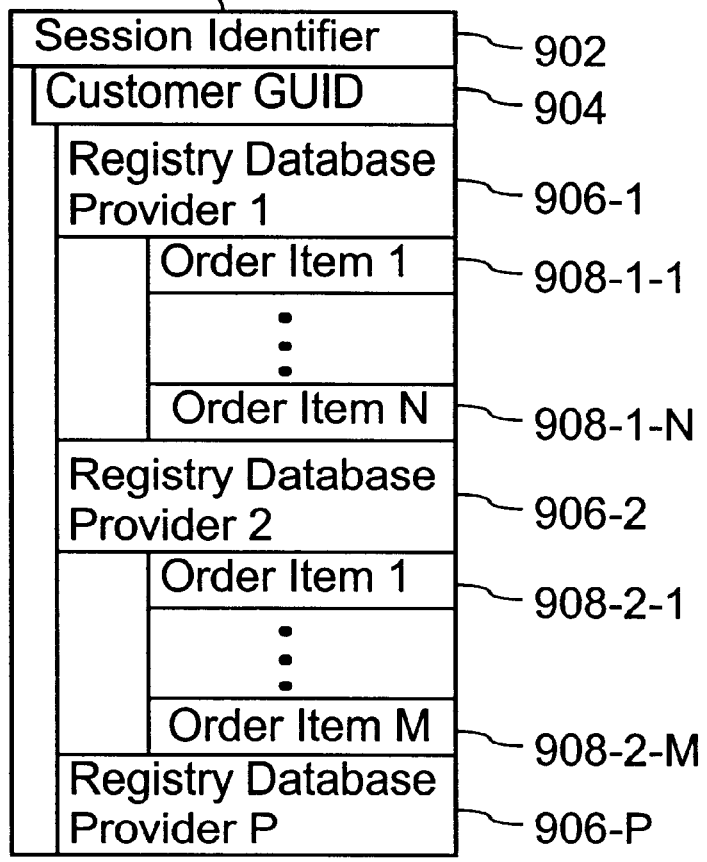
FIG. 9 illustrates an example data structure of an aggregated purchase list in accordance with an embodiment of the present invention.

In FIG. 9, a representative aggregated purchase list 900 is disclosed. The aggregated purchase list 900 includes a session identifier 902 that identifies a particular Internet session, such as a session illustrated in FIG. 7 or FIG. 8. Further, the aggregated purchase list 900 may include a guest general user identifier that is associated with the customer. When that is the case, the guest general user identifier is used to obtain credit card information from the associated guest profile. Aggregated purchase list 900 further designates each registry database provider 906 from which the guest selected a particular registry item 124 during session 902. When a particular registry database provider has more than one registry database 120 in system 100, the registry database provider field 906 includes a registry database designation 120. Finally, aggregated purchase list 900 includes the registry items 124 selected by the guest during session 902. The registry items, termed order items in FIG. 9, are categorized by database provider 906.

The system and method of the present invention allows guests to purchase gifts directly from retailers without selecting a registry or accessing a registry database. When a guest purchases a gift from a retailer without accessing a registry, 906 designates a retailer rather than a registry database provider. Thus, it is possible for an aggregated purchase list 900 to include both records 906 that designate a registry database provider and records 906 that designate a retailer.

The advantage of an aggregated purchase list is that it provides convenience to the guest. Rather than executing a series of on-line sessions to buy registry items, a guest makes all necessary selections during one session. Further, the aggregated purchase list provides transaction flexibility. That is, all purchases may be made in a single credit card transaction by server 100. In such an embodiment, respective registry database providers 906 may have accounts that are credited for purchases made through server 100. Additionally, separate credit card transactions can be arranged for those registry database providers that have no such account. Most importantly, the credit card transactions made, either collective or separate, are transparent to the guest. Now that the structure of aggregated purchase list 900 has been disclosed, one of skill in the art will appreciate the convenience that it provides to the guest.

Internet-Based Management of an Aggregated Registry

Figure 10:
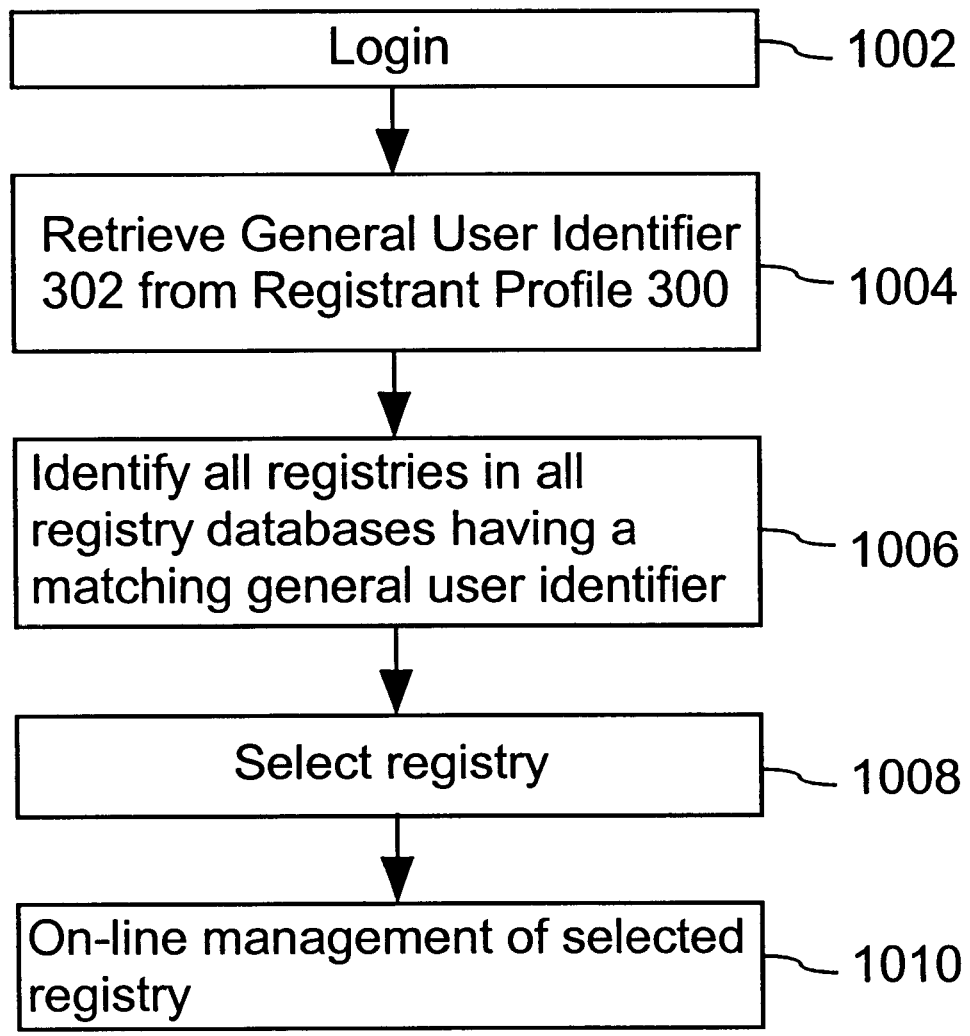
FIG. 10 illustrates processing steps associated with management of an aggregated registry over the Internet by a registrant that is facilitated by use of a general user identifier stored in a user profile in accordance with an embodiment of the present invention.

Referring to FIG. 10, some of the advantages an aggregated registry provides to a registrant are illustrated. When a registrant logs in to system 100 (1002), the general user identifier 302 is obtained from the corresponding registrant profile 300 (1004). In processing step 1006, general user identifier 302 is used to search each registry database 120 in system 100 for registries 122 having general user identifier 302. The collective set of matching registries found in processing step 1006 is the aggregated registry. The user selects one of the registries 122 in the aggregated registry in processing step 1008 and Internet-based management of the selected registry is performed in processing step 1010. In this manner, the registrant can easily manage each registry associated with the registrant in system 100 without remembering specific details about each registry. Internet-based management of a gift registry 122 in processing step 1010 may include any number of services. For example, registry items 124 may be added or deleted from the selected registry, the purchase order history of the selected registry may be reviewed, registry item order quantities may be adjusted, guests that have made orders from the selected registry may be identified and messages may be sent to such guests.

Although not shown in FIG. 10, it will be appreciated that it is possible for the registrant to update registrant profile 300 while logged into system 100. Such, an update may include personal contact information, updating a personal web page, changing an event date, specifying a new event type, updating a credit card number, modifying a guest list or E-mail address, or revising a broadcast message to be sent to select guests.

Internet-Based Management by a Registry Database Provider

Figure 11:
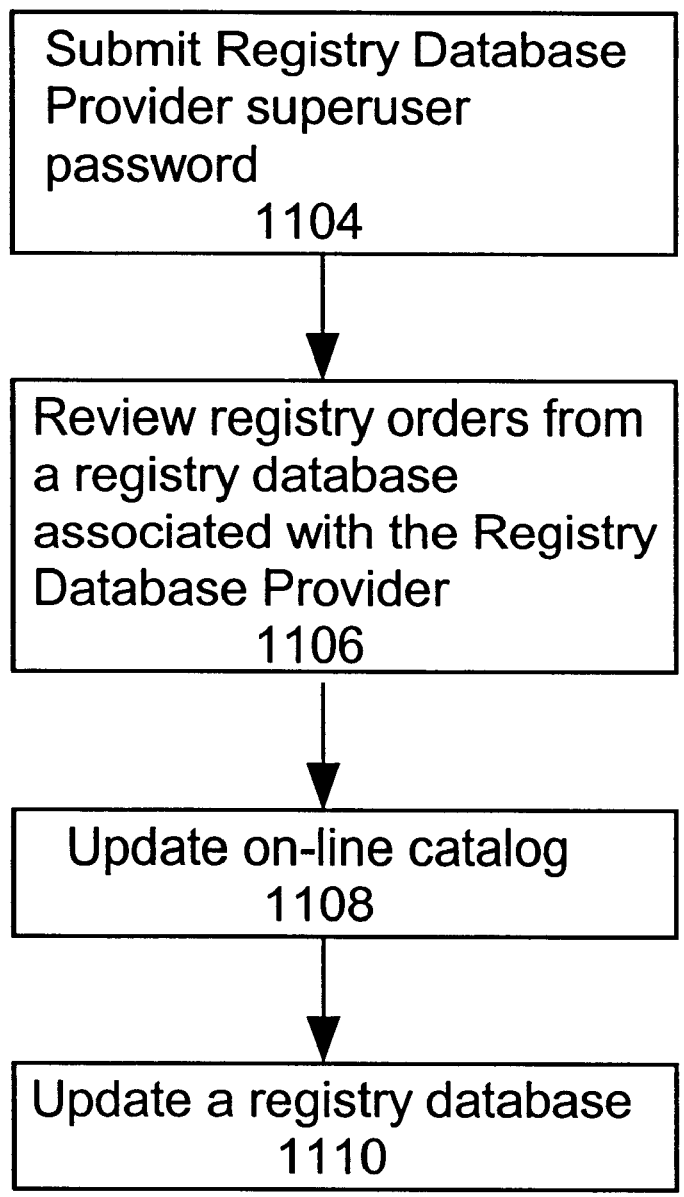
FIG. 11 illustrates processing steps used by a registry database provider to update an Internet accessible registry database in one embodiment of the present invention.

Referring to FIG. 11, additional benefits of the present invention are disclosed. In a first processing step, a registry database provider 118 or an agent for the provider specifies a superuser password in an authentication operation. When a valid superuser password is provided, access is granted to a registry database 120 associated with the superuser password. When access is granted to a registry database 120, the services of upload module 128 and download module 130 may be utilized. For example, orders associated with the registry database 120 may be reviewed and/or on-line catalog of products offered by the registry database provider 120 may be updated. In another example, the registry database 120 may be incrementally or completely updated. As one of skill in the art will appreciate, however, the registry database provider does not overwrite associations made between particular registry 122 and registrant general user identifiers 302.

Master Registry Database

Figure 12:
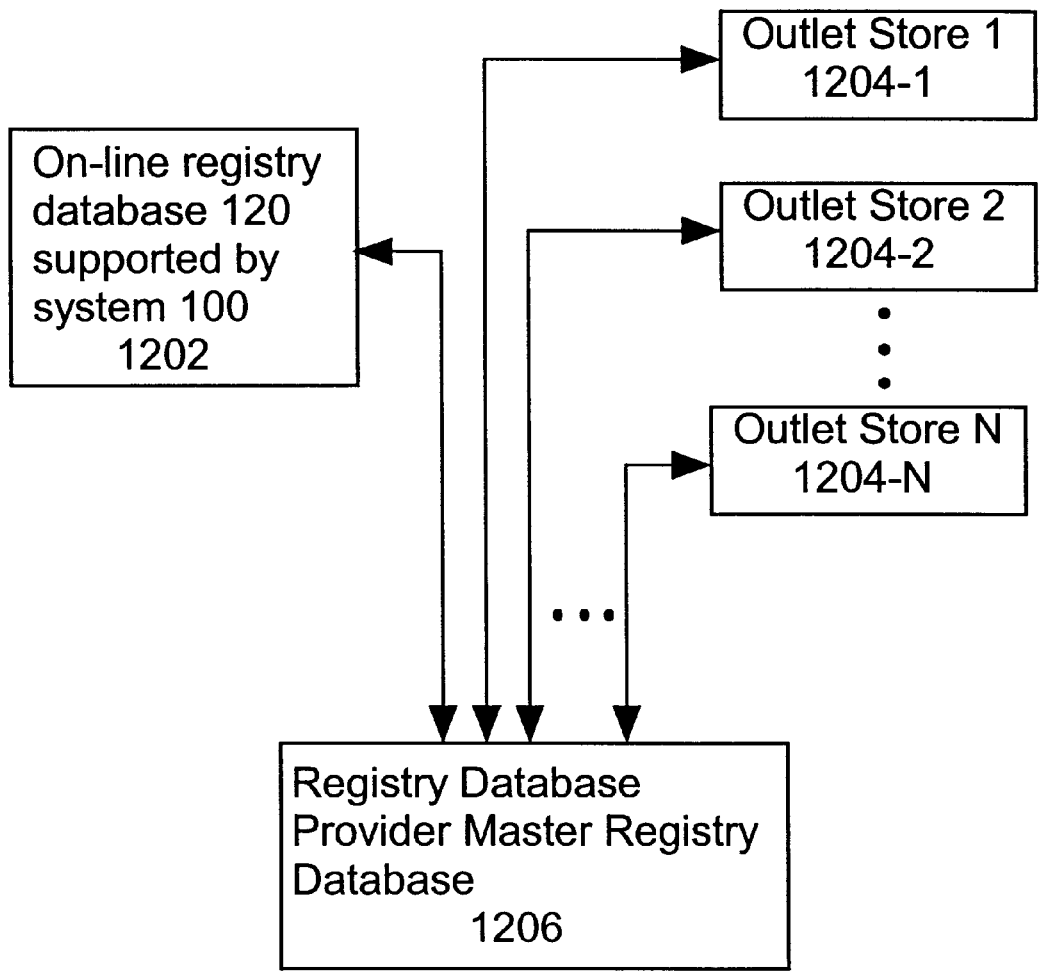
FIG. 12 illustrates a topology that interfaces an Internet accessible registry database with a master registry database and outlet store registry databases.

The present invention can be used in conjunction with a master registry database. In a preferred embodiment, the master registry database is a registry database that is maintained by a retailer that has several outlet stores. Referring to FIG. 12, each outlet store 1204 has a copy of master registry database 1206. Registry purchases made at each outlet store are tracked by the respective outlet registry database 1204. Outlet registry databases are then resolved with the master registry 1206 periodically. The resolve operation typically comprises deducting, from the master registry, the registry items purchased at the outlet stores 1204. Because of the framework of system 100, it can serve as an additional on-line "outlet." An Internet accessible registry database 1202 equivalent to an outlet store database 1204 is placed on system 100. Guests make purchases from Internet accessible database 1202. Registrants may identify registries in Internet accessible database 1202 for aggregation purposes. Internet accessible registry database 1202 is resolved with master registry database 1206 periodically using the previously disclose upload module 128 and download module 130 services. A set up such as that disclosed in FIG. 12 provides a convenient method by which registry database providers can obtain an Internet presence without investment in special equipment Further, because aggregation is database structure independent, no modification of master registry database 1206 is required when creating and supporting an Internet accessible database 1202

ALTERNATIVE EMBODIMENTS AND MODIFICATIONS

The embodiments were chosen and described in order to best explain the principles of the invention and its practical applications, to thereby enable others skilled in the art to best utilize the invention and various embodiments with various modifications as are suited to the particular use contemplated. For example, it will be appreciated that one or more components of upload module 128 may be implemented directly within web site 132. Further, one or more registry databases 120 may actually reside on one or more remote servers 142 that are accessible to system memory 114 through network interface 112. It is intended that the scope of the inventions be defined by the following claims and their equivalents.

We claim:

1. A computer system for purchasing a gift for a registrant of an event, the computer system comprising:
   one or more remote servers, each remote server in said one or more remote servers storing a registry database;
   a central server; said cental server comprising:
      a central processing unit;
      a memory coupled to the central processing unit, the memory storing a shopping module and an aggregated purchase list, the shopping module comprising:
         instructions for obtaining a first query from a guest;
         instructions for displaying, in response to said first query, a plurality of registries that match said first query, wherein said plurality of registries that match said first query includes registries from more than one registry database provider;
         instructions for receiving a selection of a first registry in said plurality of registries;
         instructions for identifying, in response to instructions from said guest, a first registry item in said first registry, wherein said first registry is stored in one of said one or more remote servers; and
         instructions for adding said first registry item to said aggregated purchase list.

2. The computer system of claim 1 wherein said first query includes a first name and a last name of a registrant that has a registry in said plurality of registries.

3. The computer system of claim 1 wherein said first query includes an event date.

4. The computer system of claim 1 wherein said shopping module further comprises instructions for performing a login procedure prior to said obtaining, the login procedure identifying a guest profile associated with said guest.

5. A computer system for purchasing a gift for a registrant of an event, the computer system comprising:
   a central processing unit;
   a memory coupled to the central processing unit, the memory storing a shopping module, registries from more than one registry database provider, and an aggregated purchase list, the shopping module comprising:
      instructions for obtaining a first query from a guest;
      instructions for displaying, in response to said first query, a first plurality of registries that match said first query, wherein said first plurality of registries that match said first query includes registries from a first plurality of registry database providers;
      instructions for receiving a selection of a first registry in said first plurality of registries;
      instructions for identifying, in response to instructions from said guest, a first registry item in said first registry; and
      instructions for adding said first registry item to said aggregated purchase list.

6. The computer system of claim 5 wherein said first query includes a first name and a last name of a registrant that has a registry in said plurality of registries.

7. The computer system of claim 5 wherein said first query includes an event date.

8. The computer system of claim 5 wherein said shopping module further comprises instructions for performing a login procedure prior to said obtaining, the login procedure identifying a guest profile associated with said guest.

9. The computer system of claim 8 wherein said shopping module further comprises instructions for purchasing said first registry item using credit card information stored in said guest profile.

10. The computer system of claim 5 wherein said shopping module further comprises:
    instructions for producing a requisition for each registry database provider represented in said aggregated purchase list, said requisition including an on-line order for each registry item in said aggregated purchase list that originated from a registry database associated with the registry database provider; and
    instructions for generating a set of on-line transactions using a purchase option associated with said guest, each transaction in said set of transactions associated with a registry database provider represented in said aggregated purchase list.

11. The computer system of claim 5 wherein said first registry item in said registry has a stock keeping unit number or a universal product code number.

12. The computer system of claim 5 wherein each registry database provider in said first plurality of registry database providers is a retailer, a department store, a small business, or a shop owner.

13. The computer system of claim 5 wherein said instructions for identifying, in response to instructions from said guest, comprises:
    instructions for opening said registry thereby allowing said guest to review registry items in the registry; and
    instructions for receiving a selection of said first registry item.

14. The computer system of claim 5 wherein said shopping module further comprises:
   instructions for obtaining a second query from said guest;
   instructions for displaying, in response to said second query, a second plurality of registries that match said second query, wherein said second plurality of registries that match said second query includes registries from a second plurality of registry database providers;
   instructions for receiving a selection of a second registry in said second plurality of registries that match said second query;
   instructions for identifying, in response to instructions from said guest, a second registry item in said second registry; and
   instructions for adding said second registry item to said aggregated purchase list.

15. The computer system of claim 14 wherein said second query includes a first name and a last name of a registrant.

16. The computer system of claim 14 wherein said second query includes an event date.

17. The computer system of claim 14 wherein said shopping module further comprises:
   instructions for producing a requisition for each registry database provider represented in said aggregated purchase list, said requisition including an on-line order for each registry item in said aggregated purchase list that originated from a registry database associated with the registry database provider; and
   instructions for generating a set of on-line transactions using a purchase option associated with said guest, each transaction in said set of transactions associated with a different registry database provider represented in said aggregated purchase list.

18. The computer system of claim 17 wherein said first registry and said second registry are from different registry database providers.

19. The computer system of claim 14 wherein each registry database provider in said second plurality of registry database providers is a retailer, a department store, a small business, or a shop owner.

20. A method of purchasing a gift for a registrant of an event, the method comprising:
   obtaining a first query from a guest;
   displaying, in response to said first query, a first plurality of registries that match said first query, wherein said first plurality of registries that match said first query includes registries from a first plurality of registry database providers;
   receiving a selection of a first registry in said first plurality of registries;
   identifying, in response to instructions from said guest, a first registry item in said first registry; and
   adding said first registry item to an aggregated purchase list.

21. The method of claim 20 wherein said first query includes a first name and a last name of a registrant that has a registry in said plurality of registries.

22. The method of claim 20 wherein said first query includes an event date.

23. The method of claim 20, the method further comprising:
   performing a login procedure prior to said obtaining, the login procedure identifying a guest profile associated with said guest.

24. The method of claim 23, the method further comprising purchasing said first registry item using credit card information stored in said guest profile.

25. The method of claim 20, further comprising:
   producing a requisition for each registry database provider represented in said aggregated purchase list, said requisition including an on-line order for each registry item in said aggregated purchase list that originated from a registry database associated with the registry database provider; and
   generating a set of on-line transactions using a purchase option associated with said guest, each transaction in said set of transactions associated with a registry database provider represented in said aggregated purchase list.

26. The method of claim 20 wherein said first registry item in said registry has a stock keeping unit number or a universal product code number.

27. The method of claim 20 wherein each registry database provider in said first plurality of registry database providers is a retailer, a department store, a small business, or a shop owner.

28. The method of claim 20 wherein said identifying, in response to instructions from said guest, comprises:
   opening said registry thereby allowing said guest to review registry items in the registry; and
   receiving a selection of said first registry item.

29. The method of claim 20, the method further comprising:
   obtaining a second query from said guest;
   displaying, in response to said second query, a second plurality of registries that match said second query, wherein said second plurality of registries that match said second query includes registries from a second plurality of registry database providers;
   receiving a selection of a second registry in said second plurality of registries that match said second query;
   identifying, in response to instructions from said guest, a second registry item in said second registry; and
   adding said second registry item to said aggregated purchase list.

30. The method of claim 29 wherein said second query includes a first name and a last name of a registrant.

31. The method of claim 29 wherein said second query includes an event date.

32. The method of claim 29, further comprising:
   producing a requisition for each registry database provider represented in said aggregated purchase list, said requisition including an on-line order for each registry item in said aggregated purchase list that originated from a registry database associated with the registry database provider; and
   generating a set of on-line transactions using a purchase option associated with said guest, each transaction in said set of transactions associated with a different registry database provider represented in said aggregated purchase list.

33. The method of claim 29 wherein said first registry and said second registry are from different registry database providers.

34. The method of claim 29 wherein each registry database provider in said second plurality of registry database providers is a retailer, a department store, a small business, or a shop owner.

35. A computer system for purchasing a gift for a registrant of an event, the computer system comprising:
   a central processing unit;
   a memory coupled to the central processing unit, the memory storing a shopping module, and registries from more than one registry database provider, the shopping module comprising:

instructions for obtaining a first query from a guest;

instructions for displaying, in response to said first query, a plurality of registries that match said first query, wherein said plurality of registries that match said first query includes registries from more than one registry database provider;

instructions for receiving a selection of a first registry in said plurality of registries; and instructions for identifying, in response to instructions from said guest, a first registry item in said first registry.

36. The computer system of claim 35 wherein said first registry is not stored in said memory.

37. The computer system of claim 36 wherein said first registry is stored in a remote server.

38. The computer system of claim 37 wherein said instructions for identifying further comprise instructions for accessing said first registry that is stored in said remote server.

39. The computer system of claim 35 wherein:

said first registry is stored in said memory;

said first registry is a copy of a registry stored in a master registry database in a remote server; and said master registry is associated with a retailer.

40. The computer system of claim 39 wherein said memory further comprises an upload module, the upload module comprising instructions for receiving an update of said master registry database from said remote server.

41. The computer system of claim 40 wherein said update of said master registry database is an incremental update.

42. The computer system of claim 40 wherein said update of said master registry database is a full update.

43. The computer system of claim 40 wherein said update is sent to said memory using the file transfer protocol.

44. The computer system of claim 39 wherein said memory further comprises a download module, the download module comprising instructions for downloading an order made by said guest to said remote server.

45. The computer system of claim 39 wherein said memory further comprises instructions for resolving said first registry with said master registry periodically.

46. The computer system of claim 45 wherein said resolving comprises deducting, from the registry in said master registry that corresponds to said first registry, those items that were purchased by said guest using said first registry.

47. A computer system for creating an aggregated registry associated with a registrant, the computer system comprising:

a central processing unit;

a network interface;

a memory coupled to the central processing unit, the memory storing a plurality of on-line catalogs, a plurality of registry databases, and an aggregation module, the aggregation module comprising:

instructions for displaying, in response to a first query, a set of registries that match said first query;

instructions for receiving a selection of a registry in said set of registries, wherein said registry is in a registry database that is in said plurality of registry databases;

instructions for associating a general user identifier with said registry, the general user identifier uniquely identifying said registrant; and instructions for repeating the execution of said instructions for displaying, instructions for receiving, and instructions for associating, thereby forming said aggregated registry;

wherein said aggregated registry comprises each registry in each registry database in said plurality of registry databases that is associated with said general user identifier.

48. The computer system of claim 47 wherein said aggregation module further comprises:

instructions for providing access to an on-line catalog through a network interface in order to build a first registry, wherein said on-line catalog is in a plurality of on-line catalogs; and instructions for adding said first registry to a registry database that is associated with said on-line catalog, wherein said registry database is in said plurality of registry databases and wherein said first aggregated registry comprises said first registry.

49. The computer system of claim 47 wherein each registry database in said plurality of registry databases corresponds to a different retailer, department store, small business, or shop owner.

50. The computer system of claim 47 wherein said general user identifier is stored in a registrant profile.

51. The computer system of claim 50 wherein said registrant profile includes a user name, an address and an E-mail address.

52. The computer system of claim 47 wherein said general user identifier allows for the identification of the registrant without the use of the actual name of the registrant.

53. A method of creating an aggregated registry associated with a registrant, said method comprising:

displaying, in response to a first query, a set of registries that match said first query;

receiving a selection of a registry in said set of registries, wherein said registry is in a registry database that is in a plurality of registry databases;

associating a general user identifier with said registry, the general user identifier uniquely identifying said registrant; and repeating said displaying, receiving, and associating, thereby forming said aggregated registry;

wherein said aggregated registry comprises each registry in each registry database in said plurality of registry databases that is associated with said general user identifier.

54. The method of claim 53 wherein said method further comprises:

providing access to an on-line catalog through a network interface in order to build a first registry, wherein said on-line catalog is in a plurality of on-line catalogs; and adding said first registry to a registry database that corresponds to said on-line catalog, wherein said registry database is in said plurality of registry databases and wherein said first aggregated registry comprises said first registry.

55. The method of claim 54 wherein each registry database in said plurality of registry databases corresponds to a different retailer, department store, small business, or shop owner.

56. The method of claim 53 wherein said general user identifier is stored in a registrant profile.

57. The method of claim 55 wherein said registrant profile includes a user name, an address and an E-mail address.

58. The method of claim 53 wherein said general user identifier allows for the identification of the registrant without the use of the actual name of the registrant.

59. A method of registering with a plurality of registry database providers, said method comprising:
  (i) choosing an on-line catalog associated with a retailer, wherein said on-line catalog is in a plurality of on-line catalogs provided through a network interface;
  (ii) identifying items in said on-line catalog;
  (iii) creating a registry that includes said items;
  (iv) adding said registry to a registry database associated with said online catalog, wherein said registry database is in a plurality of registry databases; and
  (v) repeating steps (i), (ii), (iii), and (iv) with a different on-line catalog associated with a different retailer in said plurality of on-line catalogs and a registry database that is associated with said different on-line catalog, thereby registering with said plurality of registry database providers.

60. The method of claim 59 wherein each registry database provider in said plurality of registry database providers is a different retailer, department store, small business, or shop owner.

61. The method of claim 59 wherein one or more of said plurality of registry databases resides on one or more remote servers.

62. A computer system for registering with a plurality of registry database providers, the computer system comprising:
  a central processing unit;
  a network interface; and
  a memory coupled to the central processing unit, the memory storing a plurality of on-line catalogs, a plurality of registry databases, and a web site interface, said web site interface comprising:
    instructions for choosing an on-line catalog associated with a retailer, wherein said on-line catalog is in said plurality of on-line catalogs provided through said network interface;
    instructions for identifying items in said on-line catalog;
    instructions for creating a registry that includes said items;
    instructions for adding said registry to a registry database associated with said on-line catalog, wherein said registry database is in a plurality of registry databases; and
    instructions for repeating the execution of said instructions for choosing, said instructions for identifying, said instructions for creating, and said instructions for adding with a different on-line catalog in said plurality of on-line catalogs and a registry database that is associated with said different on-line catalog.

63. The computer system of claim 62 wherein each registry database provider in said plurality of registry database providers is a different retailer, department store, small business, or shop owner.

64. The computer system of claim 62 wherein one or more of said plurality of registry databases resides on one or more remote servers accessible to said memory through said network interface.

65. A computer system for registering with a plurality of registry database providers, the computer system comprising:
  a central processing unit;
  a network interface; and
  a memory coupled to the central processing unit, the memory storing a web site interface, the web site interface comprising:
    (A) instructions for receiving a selection of an on-line catalog associated with a registry database provider in said plurality of registry database providers, wherein said on-line catalog is in a plurality of on-line catalogs provided through said network interface;
    (B) instructions for receiving a selection of an item in said on-line catalog;
    (C) instructions for creating a registry that includes said item;
    (D) instructions for adding said registry to a registry database associated with said on-line catalog wherein said registry database is associated with said registry database provider; and
    (E) instructions for repeating the execution of said instructions for receiving a selection of an on-line catalog (A), said instructions for receiving a selection of an item (B), said instructions for creating a registry (C), and said instructions for adding (D) using a different on-line catalog in said plurality of on-line catalogs.

66. The method of claim 65 wherein each registry database provider in said plurality of registry database providers is a retailer, a department store, a small business, or a shop owner.

67. The computer system of claim 65 wherein said registry database associated with said on-line catalog is not stored in said memory.

68. The computer system of claim 65 wherein said registry database associated with said on-line catalog is stored in a remote server accessible to said memory through said network interface.

* * * * *